United States Patent Office 3,547,964
Patented Dec. 15, 1970

3,547,964
GROUP VIII NOBLE METAL CATALYST
RECOVERY
Kenneth L. Olivier, Placentia, Calif., assignor to Union Oil Company of California, Los Angeles, Calif., a corporation of California
No Drawing. Filed July 24, 1968, Ser. No. 747,125
Int. Cl. C07f 15/00, 15/04
U.S. Cl. 260—429
12 Claims

ABSTRACT OF THE DISCLOSURE

A method for the recovery of complexes of Group VIII metals with biphyllic ligands from hydrocarbons or high boiling residues formed in hydrocarbonylation of olefins. The Group VIII catalyst metal is recovered by treatment of the high boiling fraction of a hydroformylation reaction medium with a peroxide at a temperature from about 25° to 200° C. and a pressure from about 1 to 1000 atmospheres, sufficient to maintain liquid phase conditions during the contacting. The peroxide treatment precipitates the complex of the Group VIII metal from the solvent. Preferably, the precipitation is effected in the presence of an imiscible aqueous phase in which the precipitate is soluble, thereby effecting extraction of the metal complex. The Group VIII metal complex can be recovered from the aqueous extract phase by extraction, in the absence of the peroxide, with a solvent immiscible with the extract phase and containing excess biphyllic ligand.

DESCRIPTION OF THE INVENTION

The invention relates to a method for the recovery of Group VIII metal values from organic solvents. The invention further relates to the recovery of the complexes of Group VIII metals with trihydrocarbyl ligands from non-polar organic solvents and, in a specific embodiment, relates to the treatment of a portion of the reaction medium used in the hydroformylation of olefins to carbonyls to recover the catalyst therefrom prior to discard of a portion of the reaction medium containing the tarry and high boiling byproducts formed during the reaction.

Recent advances in homogeneous catalysis have included the preparation and use of soluble complexes of Group VIII metals and biphyllic ligands such as the trihydrocarbyl phosphines, phosphites, stibines, arsines and bismuthines. These complexes are useful for a variety of reactions such as hydrogenation of carbonyls, olefins, etc.; hydroformylation of olefinic substrates to carbonyls and alcohols and the hydrocarboxylation of olefins to carboxylic acids. Processes based on the use of these homogeneous catalysts unavoidably encounter the formation of high boiling byproducts of the reaction, e.g., tars and high boiling aldol condensation products in hydroformylation or hydrogenation of carbonyls; dimers or oligomers formed during hydrogenation of olefinic substrates, etc.

The commercial adoption of the aforementioned hydroformylation requires the removal and discard of a portion of the reaction medium to avoid excessive accumulation of the high boiling products; however, the expense of the aforementioned highly active catalyst prohibits its discard. Accordingly, it is desirable that a method be devised for the economical recovery of the homogeneous Group VIII metal-trihydrocarbyl ligand complexes. Such a method is particularly needed in combination with the Group VIII noble metal catalysis where the high cost of the noble metals necessitates almost complete recovery of the catalyst prior to discarding of the high boiling and tarry constituents.

It is an object of this invention to provide a method for the recovery of Group VIII metal values from non-polar organic solvents.

It is a further object of this invention to provide a method for the recovery of Group VIII metal complexes of biphyllic ligands.

It is a further object of this invention to provide a method for the recovery of complexes of Group VIII metals and trihydrocarbyl ligands employed in hydrogenation or hydroformylation reactions.

It is an additional object of this invention to provide a method for the recovery of Group VIII metal complexes of trihydrocarbyl ligands from non-polar solvents containing tars and high boiling byproducts.

I have found that the aforementioned objects can be secured by treatment of the non-polar solvent containing the tars and high boiling hydroformylation byproducts with a peroxide. The peroxide apparently oxidizes the catalyst and changes its solubility so that the catalyst precipitates from the solvent. Preferably the treatment is effected in he presence of an immiscible aqueous phase since the precipitated catalyst is soluble in aqueous media. In this manner, a single step extraction of the catalyst from the tar laden solvent can be accomplished.

While not wishing to be bound by an unproven theory on the mechanism of the treatment, I believe that the peroxide treatment oxidizes the biphyllic ligand to an oxide derivative which is not significantly active for complexing with the Group VIII metal catalyst. Some or all of the biphyllic ligand molecules are thereby displaced from the complex and this displacement changes the solubility of the complex so that it precipitates from the non-polar solvent.

Since the peroxide treatment results in oxidation of the biphyllic ligand, I prefer to precede the peroxide treatment with an extraction to remove any excess biphyllic ligand therefrom, i.e., to separate substantially all the biphyllic ligand which is not in complex association with Group VIII metal. This prior extraction conserves the excess biphyllic ligand for subsequent use or recycling to the hydroformylation reaction.

The excess or uncomplexed biphyllic ligand is weakly basic and can, therefore, be extracted with dilute aqueous solutions of strong mineral acids, e.g., 0.1 to about 3 normal concentrations of acids such as sulfuric, hydrohalic, nitric, etc. After extraction the biphyllic ligand can be precipitated from the extract acid phase by dilution of the acid phase with water and separated therefrom for recycling to the hydroformylation zone.

The metal complex which has been extracted into an aqueous solvent by the peroxide treatment can be recovered from the aqueous solvent by treatment thereof with a non-polar solvent containing the biphyllic ligand. This recovery step is performed in the absence of any peroxide and the efficiency of the recovery is enhanced if the treatment is performed in the presence of carbon monoxide which can be bubbled through the liquid phases at atmospheric, or preferably, superatmospheric pressures. When a hydroformylation reaction solvent, hereinafter described, is used in the recovery step, the complex can be extracted directly into the non-polar solvent for recycling to the hydroformylation reaction zone.

The peroxide treatment can be performed on a hydrocarbon solution of the Group VIII metal-biphyllic ligand complex in any of the hydrocarbon solvents hereafter mentioned. The invention thus employed serves as a separation step for the complex. The most useful application of the invention is for the selective removal of Group VIII metal-biphyllic ligand complexes from hydroformylation residues containing high boiling residues and byproducts. Of particular value is the application of the invention to recovery of the Group VII noble metal catalyst values from hydroformylation residues because of the high value of the noble metal values.

The process of hydrocarbonylation wherein my invention affords the greatest value is that described in copending applications Ser. Nos. 518,562 and 642,191. The process comprises contacting an olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst described is a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst described is a Group VII noble metal hydride complex with carbon monoxide and a biphyllic ligand.

The biphyllic ligands are organic compounds capable of forming a complex with the catalyst by forming a coordinate covalent bond with a metal and simultaneously accepting an electron from the metal. These ligands have an atom with an unshared pair of electrons for such bonding and are organic compounds of trivalent phosphorus, antimony, arsenic or bismuth. Typically, the biphyllic ligand is an aromatic phosphine such as triphenylphosphine.

During hydroformylation there occurs a slight but continuous accumulation of high boiling byproducts and tar which remain in the bottoms from the distillation zone used to recover the products. These are recycled to the reaction zone with the bottoms stream which also contains the catalyst. In accordance with my invention all or a portion of this liquid residue fraction is contacted with a peroxide to precipitate the metal complex, preferably in the presence of an aqueous medium which thereby effects the selective extraction of the catalyst from the liquid residue. The catalyst complex precipitate can be recovered from the tar laden solvent by conventional steps such as filtration; however, as previously mentioned, since the metal complex after peroxide treatment is water soluble, I prefer to extract the catalyst complex by contacting the tar laden solvent with an aqueous solvent. This contacting can be simultaneous with the oxidizing treatment or can be subsequent thereto. After separation of the catalyst complex from the liquid residue containing the tar and high boiling byproducts, the latter can suitably be discarded.

The catalyst complex can thereafter be redissolved in fresh solvent containing unoxidized biphyllic ligand for returning to the reaction zone. This can be effected by extraction of the catalyst complex from its aqueous solution by contacting with a non-polar solvent solution of the biphyllic ligand. Surprisingly, I have found that when this treatment is performed in the absence of any oxidizing agent, recovery of the catalyst from the aqueous extract can be achieved. The treatment does not destroy the complex catalyst composition or impair its activity when it is subsequently employed in the hydrocarbonylation reaction.

Since the peroxide treatment oxidizes some or all the biphyllic ligand, economical processing requires that any excess biphyllic ligand be separated from the tar laden, catalyst containing solution before treatment with the peroxide. Such separation can be effected with dilute aqueous solutions of mineral acids which extract the weakly basic biphyllic ligand. Suitable acids include nitric acid, sulfuric acid, hydrohalic acids, etc., at concentrations from 0.1 to about 3 normal. The ligand extraction can be performed at a temperature from about 15° to about 125° C., preferably from 25° to 75° C. and at sufficient pressure to maintain liquid phase conditions. After separation of the aqueous extract from the tar and catalyst laden solvent, the biphyllic ligand can be precipitated from the extract phase and thereby recovered by dilution of the acid with the addition of from 2 to about 10 times its volume of water or by neutralization of the acid with a base such as sodium hydroxide or ammonia. The biphyllic ligand can then be filtered from the extract or can be extracted into a non-polar solvent by washing the diluted or neutralized extract phase with the non-polar solvent.

The acid should be present in the aqueous solution at a sufficient concentration to effect the extraction of the biphyllic ligand but preferably not sufficient to extract the catalyst complex. This concentration for the aforementioned acids is from 0.1 to about 3 normal and the maximum strength can readily be determined by admixing the particular acid under investigation for use as an extractant with a toluene or other hydrocarbon solution containing dissolved quantities of the metal complex. Solutions of the metal complexes are colored and the decoloring of the toluene solution can be observed as the criterion for determination of the maximum acid strength, i.e., the acid solution should be of insufficient concentration so that when admixed with a toluene solution of the metal complex, the acid solution will not decolor the toluene solution. As previously mentioned, such acid concentrations are about 0.1 to 3 normal.

The peroxide treatment can be effected at a temperature from about 25° to about 200° C., preferably from about 75° to about 175° C. The pressure can be from atmospheric to 1000 atmospheres or more; however, it is preferred to use only sufficient pressure to maintain a liquid phase since the peroxide treatment is otherwise unaffected by elevated pressures. The duration of the treatment can be from 5 seconds to several hours or more and sufficient time should be allowed at the reaction temperature to permit completion of the oxidation. The completeness of the oxidation, i.e., precipitation of the catalyst, can be monitored by observing the decoloring of the tar laden solvent phase. Since the catalyst complex has an intense color, its precipitation effects decoloring of the tar laden solvent and the treatment can be stopped after substantial decoloring has been effected.

When the preferred simultaneous extraction and peroxide treatment is practiced, I prefer to employ neutral to acidic conditions for the treatment, i.e., perform the treatment in the presence of sufficient acid to adjust the pH to 7.0 or less; most preferably from about 6 to 2. Any suitable acid such as aqueous solutions of the mineral acids aforementioned or a $C_2$ to $C_5$ alkanoic acid, benzoic acid, etc. can be used for this purpose. Under the acid to neutral conditions I have observed that a clean separation of the aqueous and non-aqueous phases can be effected whereas if the extraction is attempted under alkaline conditions an interfacial precipitate is formed. When the catalyst is simply precipitated and recovered from the tar laden solvent by other procedures, e.g., filtration, even alkaline conditions can be used if desired for the peroxide treatment since the formation of a solid having limited water solubility doesn't affect the filtration step.

Suitable peroxides that can be used for the oxidation treatment include a wide variety of compounds. Since the function of the peroxide is to effect oxidation of the biphyllic ligand, any peroxide that has an appreciable rate of decomposition at the treatment temperatures can be satisfactorily employed. Suitable classes of peroxides include organic and inorganic peracids and their alkali metal and alkaline earth metal salts, organic and inorganic peroxides and hydroperoxides.

Examples of inorganic peroxides and peracids include hydrogen peroxide, persulfuric acid, sodium peroxide, lithium peroxide, potassium peroxide, barium peroxide, calcium peroxide, cesium peroxide, sodium persulfate, lithium persulfate, potassium persulfate, etc.

Examples of useful organic peracids include the peracids of $C_1$ to $C_8$ alkanoic and aromatic carboxylic acids, e.g., performic, peracetic, perpropionic, perbutyric, percaproic, per-monochloroacetic, per-2-ethylhexanoic, perhaptanoic, perbenzoic, perphthalic, pertoluic acids, etc.

Examples of useful organic hydroperoxides include the $C_1$ to $C_8$ alkyl, cycloalkyl and aralkyl hydroperoxides, e.g., methyl, ethyl, propyl, isopropyl, n-butyl, sec-butyl, t-butyl, t-amyl, 1,1-diethylpropyl, 1,1,2-trimethylpropyl, 1-methylhexyl, cyclohexyl, 1-methylcyclohexyl, α-methylbenzyl, cumyl, α-p-xylyl, diphenylmethyl, triphenylmethyl, 1-inandyl hydroperoxide, etc.

Examples of useful organic peroxides include the dialkyl, diaralkyl and diaroyl peroxides having alkyl, aralkyl and aryl groups with from 1 to about 8 carbons, e.g., dimethyl, methyl, ethyl, diethyl, dipropyl, diisopropyl, methyl-t-butyl, ethyl-t-butyl, isopropyl-t-butyl, n-butyl-t-butyl, sec-butyl-t-butyl, di-t-butyl, di-t-amyl, dicumyl, ditriphenylmethyl, bibenzoyl, bis(p-methoxybenzoyl), p-methoxybenzoyl, bis(p-nitrobenzoyl) peroxides, etc.

The amount of peroxide employed in this treatment is that sufficient to oxidize the biphyllic ligand present in the catalyst complex. This amount can be from 0.25 to about 5.0 times, preferably from 0.5 to about 2.0 times the molar quantity of ligand in the complex. Excessive amounts of peroxide are not preferred in this treatment since any residual peroxide should preferably not be carried into the catalyst complex recovery treatment of the extract phase.

After completion of the precipitation of the metal complex from the tar laden solvent, or its extraction into the aqueous phase, the catalyst complex is separated from the tar laden solvent. When an aqueous phase is present this is accomplished by simple phase separation. When only the tar laden liquid phase is present, the solid precipitate which contains the catalyst can be recovered by filtration, e.g., by passing the admixture of solid and liquid through a conventional filter medium such as a fritted glass plate or a fiber filter using conventional vacuum or pressure filtration equipment. When an aqueous extract of the catalyst complex is recovered, I prefer to heat the extract to a temperature of about 25° to 150° C. for a period of several minutes to an hour to insure that any residual peroxides present in the extract are decomposed before recovery of the catalyst from the extract.

When the higher molecular weight organic peroxides or hydroperoxides are used, e.g., those having greater than about 3 carbons, which are soluble in non-polar solvents, any residual peroxides will be in the non-polar solvent and will not be present in any significant quantity in the aqueous extract. In such cases, this heat treatment of the extract phase need not be practiced prior to recovery of the catalyst metal complex therefrom.

The catalyst metal complex is recovered in a form that can be directly recycled to the hydroformylation zone by treating the solid filter cake separated in the filtration step or the aqueous extract phase separated in the preferred extraction step with a non-polar solvent containing a biphyllic ligand. The biphyllic ligand complexes with the metal catalyst, rendering it water insoluble and non-polar-solvent soluble. This treatment thereby effects extraction of the metal complex from the aqueous phase or dissolution of the solid filter cake.

In the metal complex recovery step, the aqueous extract or filter cake is admixed with from 0.25 to about 10 volumes, preferably from 1 to about 5, non-polar solvent per volume of extract or of filter cake. The solvent should contain from 1 to about 100; preferably from 5 to about 20 molar parts biphyllic ligand per atom of metal in the complex.

The temperature of the metal complex recovery step can be from 5° to 200° C.; preferably from 25° to 125° C. I have found that the efficiency of the recovery of the metal complex can be enhanced by the presence of carbon monoxide and therefore I prefer to contact the admixture during recovery with carbon monoxide at a pressure from 1 to about 1000 atmospheres, preferably from 5 to about 200 atmospheres, with the carbon monoxide partial pressure comprising from 20 to 100 percent of the applied pressure. The phases, solid-liquid or liquid-liquid in this recovery step are intimately admixed, then permitted to settle and the non-polar solvent liquid phase which contains the recovered catalyst complex is separated from the remaining solid phase or the aqueous phase. With liquid-liquid separation conventional extraction procedures and equipment can be used, while with solid-liquid separation, conventional filtration procedure and equipment can be used to recover either an extract phase or a filtrate enriched with the recovered metal complex.

To reduce the volume of high boiling hydroformylation byproducts to be treated in the peroxide treatment step, I prefer to evaporate all volatilizable components from the hydroformylation reaction medium by vacuum distillation at temperatures from 95° to 225° C. at a pressure from 1 to 250 millimeters mercury before treatment with the peroxide. When the resulting vacuum residue is too viscous for facile extraction it can be diluted with a suitable inert solvent. Preferably, a non-polar organic solvent is used to dilute the residue. Examples of suitable non-polar solvents include the aromatic, aliphatic or alicyclic hydrocarbons.

Examples of such hydrocarbons that can also be employed as hydroformylation reaction solvents include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane, methylcyclopentane, Decalin, indane, etc.

HYDROFORMYLATION SOLVENTS

The aforementioned hydrocarbons are also preferred solvents for the hydroformylation reaction, particularly the aromatic hydrocarbons; however, amides, esters, sulfoxides, or ethers can also be used. In addition, other solvents which are similarly inert to the catalyst and reactants under the hydroformylation conditions such as ketones, aldehydes and alcohols can be used for the hydroformylation solvent if desired. With the preferred processing, i.e., vacuum evaporation to reduce the volume of residue for extraction, these solvents are removed from the residue prior to the peroxide treatment.

Ethers which can be employed as hydroformylation solvents include the $C_1-C_6$ alkyl ethers of $C_1-C_6$ alkanols and glycols such as diisopropyl ether, di-n-butyl ether, ethylene glycol dibutyl ether, diisoamyl ether, methylhexyl ether, methylamyl ether, dichloroethyl ether, ethylene glycol diisoamyl ether, diethylene glycol diethyl ether, ethyl isopropyl ether, diethylene glycol diethyl ether, diethylene glycol dimethyl ether, ethylene glycol dibutyl ether, ethylene glycol diamyl ether, triethylene glycol diethyl ether, diethylene glycol di-n-hexyl ether, tetraethylene glycol dimethyl ether, tetraethylene glycol dibutyl ether, etc.

Esters of hydrocarbon alkanoic acids having from 1 to about 12 carbons with alkanols and alkanediols having from 1 to about 10 carbons can also be used as hydroformylation solvents. Examples of this class of solvents include ethylformate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethylene glycol diacetate, glycol butyrate, isoamyl n-butyrate, isoamyl isovalerate, etc. A preferred class of ester solvents includes the lactones, e.g., butyrolactone, valerolactone and their derivatives having lower $(C_1-C_5)$ alkyl substituents.

The amides of formic acid and hydrocarbon alkanoic acids can also be used as hydroformylation solvents. Examples include the simple amides as well as the N-alkyl and N,N-dialkyl substituted amides, e.g., dimethyl formamide, N-methylacetamidt, N-amylpropionamide, N,N-dimethylbutamide, N-methylvaleramide, N-isopropyl-hexanoic amide, N,N-dimethyl heptanoic amide, octanoic amide, N-methyl nonanoic amide, decanoic amide, etc. Alkyl sulfoxes can also be used as the solvent and suitable examples include those with $C_1$ to $C_{10}$ alkyl groups such as dimethyl sulfoxide, diethyl sulfoxide, diisopropyl sulfoxide, diamylsulfoxide, methyldecyl sulfoxide, ethylnonyl sulfoxide, isopropylhexyl sulfoxide, ethylhexylsulfoxides, etc.

Examples of various alkyl and aryl ketones which can be employed as the hydroformylation reaction solvent include, e.g., acetone, methylethyl ketone, diethyl ketone, diisopropyl ketone, ethyl-n-butyl ketone, methyl-n-amyl ketone, cyclohexanone, diisobutyl ketone, etc.

Alcohols can also be employed as hydroformylation reaction solvents. Preferably tertiary alcohols are employed since these materials are substantially non-reactive under the hydrocarbonylation conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

Also useful as solvents for the hydroformflation reaction are the aldehyde products of the carbonylation. These products are surprisingly inert and resist aldol condensation and hydrogenation under the hydroformylation conditions. Accordingly, aldehydes such as propionaldehyde, butyraldehyde, valeric, hexanoic, heptenoic, caproic, decanoic aldehydes, etc., can be employed as the reaction medium.

GROUP VIII METAL

The Group VIII metal is present in the aforementioned organic solvents as a metal hydride or salt, typically a halide, in complex association with carbon monoxide and a biphyllic ligand. There can also be incorporated in the reaction solution a polycyclic, heterocyclic amine having a nitrogen in at least one bridgehead position. Examples of Group VIII metal hydrides, carbonyls or salts include those which are commercially available. Examples of suitable sources of the metal values are as follows:

bis(triphenylphosphine)iridium carbonyl chloride;
tris(triphenylphosphine)iridium carbonyl hydride;
iridium carbonyl;
iridium tetrabromide;
iridium tribromide;
iridium trifluoride;
iridium trichloride;
osmium trichloride;
chloroosmic acid;
palladium hydride;
palladous chloride;
palladous cyanide;
palladous iodide;
palladous nitrate;
platinic acid;
platinous iodide;
palladium cyanide;
sodium hexachloroplatinate;
potassium trichloro(ethylene)platinate(II);
chloropentaaminorhodium(III)chloride;
rhodium dicarbonyl chloride dimer;
rhodium nitrate;
rhodium trichloride;
tris(triphenylphosphine)rhodium carbonyl hydride;
tris(triphenylphosphine)rhodium(I)chloride;
ruthenium trichloride;
tetraaminorutheniumhydroxychloro chloride, etc.

Suitable salts of other Group VIII metals include cobalt chloride, ferric acetate, nickel fluoride, cobalt nitrate; etc., carboxylates of $C_2$–$C_{10}$ acids, e.g., cobalt acetate, cobalt octoate, etc., nickel sulfate, ferric nitrate, etc.

LIGAND

The metal is present in complex association with a biphyllic ligand, i.e., a trihydrocarbyl ligand. The ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these, the phosphines are preferred; however, phosphites, arsines, stibines and bismuthines can also be employed. In general, these biphyllic ligands have the following formula:

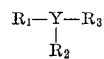

wherein:

Y is As, Sb, P, Bi or $P(O)_3$;

$R_1$ and $R_2$ are alkyl from 1 to about 8 carbons, aryl from 6 to about 9 carbons or amino, or halo substitution products thereof; and $R_3$ is alkyl from 1 to 8 carbons, aryl from 6 to 9 carbons or

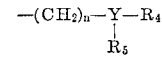

wherein:

$n$ is from 1 to about 6; and $R_4$ and $R_5$ are alkyl from 1 to about 8 carbons or aryl from 6 to about 9 carbons.

Examples of suitable biphyllic ligands useful in my invention to stabilize the catalyst composition are the following:

trimethylphosphine,
trimethylphosphite,
triethylarsine,
triethylbismuthine,
triisopropylstibine,
chlorodiethylphosphine,
chlorodipropylarsine,
tri(aminobutyl)arsine,
tris(aminoamyl)phosphine,
ethyldiisopropylstibine,
tricyclohexylphosphine,
tri(aminocyclohexyl)stibine,
triphenylphosphine,
triphenylphosphite,
triphenylbismuthine,
tris(N,N-dimethylanilyl)phosphine,
tris(o-tolyl)phosphine,
triphenylbismuthine,
tris(2-ethylhexyl)arsine,
tris(methylcyclopentyl)stibine,
tris(chlorophenyl)bismuthine,
trianilylbismuthine,
phenyldiisopropylphosphine,
phenyldiamylphosphine,
ethyldiphenylphosphine,
chlorodixylylphosphine,
chlorodiphenylphosphite, tri(N,N-diethylaminomethyl)phosphine,
ethylene bis(diphenylphosphine),
tritolylphosphine,
tricyclohexylphosphite,
tris(methylcyclopentyl)arsine,
tritolylstibine,
hexamethylene bis(diisopropylarsine),
pentamethylene bis(diethylstibine),
diphenyl(N,N-dimethylanilinyl)phosphine,
triphenylanilylethylenediphosphine,
trianilinylphosphine,
tris(3,5-diaminophenyl)phosphine,
trianilinylarsine,
anilinyldiphenylbismuthine,
aminoethyltriisopropylhexamethylenediphosphine,
chlorophenyltriphenylpentamethylenediarsine,
tetraethylethylenedibismuthine,
tetraphenylethylenediphosphite,
tetramethyltrimethylenedistibine,
tris(p-methoxyphenylene)phosphine,
tris(m-pentoxyphenylene)phosphite,
tris(p-bromophenyl)arsine,
tris(3,5-dichlorophenyl)stibine,
trischloromethylphosphine,
tris(2-methoxybutyl)phosphine, etc.

Of the aforementioned, the aryl phosphines are preferred with Group VIII noble metals because of the demonstrated greater activity of these noble metal catalysts comprising the aryl phosphines while the alkyl phosphines are preferred with the iron group metals, iron, cobalt and nickel because of the greater activity of this combination with the iron group metals.

METAL COMPLEX

As previously mentioned, some of the Group VIII metal-biphyllic ligand complexes are commercially available. Others can be prepared in the manner described in the aforecited copending applications or in the manner described in U.S. Pat. 3,102,899. In the preparation, the metal complex is readily formed upon admixture of the metal, salt, hydride or a complex thereof with a solution of the biphyllic ligand which, preferably, is used in excess of the stoichiometric quantity present in the complex. To obtain various oxidation states of the metal in the complex, oxidizing or reducing treatments can be employed such as treatment of the complex with oxygen or a reducing agent such as hydrogen, carbon monoxide, hydrazine, alkali metal, e.g., sodium, potassium, lithium, etc., dithionites or borohydrides. Preferably the metal is complexed in an elevated valency and its various oxidation states are achieved by treatment with any of the aforementioned reducing agents at a temperature from 25° to about 175° C. and pressures from 1 to about 100 atmospheres, the superatmospheric pressures being preferred with the gaseous reducing agents.

HYDROFORMYLATION REACTION

The invention has particular value in application to the treatment of the high boiling byproduct or residue formed in the hydroformylation reaction. In this reaction an ethylenically unsaturated compound is carbonylated or hydroformylated by contacting it with hydrogen and carbon monoxide in the present of an inert liquid phase of a non-polar organic solvent containing dissolved quantities of the aforementioned Group VIII metals in complex association with the biphyllic ligand. The olefin, carbon monoxide and hydrogen are contacted with the liquid reaction medium at temperatures from about 20° to about 300° C. and pressures from 1 to about 100 atmospheres. The high boiling tars and byproducts of the reaction accumulate in the reaction medium and are concentrated in the residue remaining from the distillation of the reaction medium in the distillative recovery of the products. The bulk of the distillate residue comprises reaction solvent, catalyst and the accumulated high boiling byproducts and this residue is removed from the distillation zone and recycled to further contacting.

The residue is treated in accordance with my invention by removing from about 1 to about 25 percent of the residue and treating this removed residue to remove the catalyst values therefrom. Prior to the peroxide treatment of the removed portion of the reaction residue, the residue can be further concentrated by distillation at subatmospheric pressures, e.g., distillation at a temperature from 90° to 225° C. and from 1 to 600 millimeters mercury pressure, preferably from 10 to about 250 millimeters mercury, to remove additional quantities of the reaction solvent which can be returned to the reaction zone. When the reaction medium also contains a heterocyclic, polycyclic bridgehead amine, I prefer to water wash the reaction solvent prior to the peroxide treatment step and, preferably, prior to the vacuum distillation step to extract the basic amine from the reaction residue.

The hydroformylation reaction medium usually contains an excess quantity of the biphyllic ligand that is used to stabilize the metal complex. As previously mentioned, I prefer to extract this excess or uncomplexed ligand from the reaction medium before the peroxide treatment to prevent its oxidation. Suitably, this extraction of the biphyllic ligand is performed prior to the vacuum distillation of the residue to avoid the treatment of a highly viscous material.

The ethylenically unsaturated compound carbonylated in accordance with my invention can comprise any hydrocarbon olefin having from 2 to about 25 carbons; preferably from 2 to about 18 carbons. This olefin has the following structure:

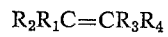

$$R_2R_1C=CR_3R_4$$

wherein $R_1$, $R_2$, $R_3$ and $R_4$ are hydrogen, alkyl, cycloalkyl, aryl, alkaryl or aralkyl, or wherein one of said $R_1$ and $R_2$ and one of said $R_3$ and $R_4$ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-ethylhexene-1, isobutylene, octene-1, 2-propylhexene-1, ethylcyclohexene, decene-1, cycloheptene, cyclooctene, cyclononene, 4,4'-dimethylnonene-1, dodecene-1, undecene-3, 6-propyldecene-1, tetradecene-2, 7-amyldecene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinylnaphthalene, 1,1-diphenylethylene, allybenzene, 6-phenylhexene-1, 1,3-diphenylbutene-1, 3-benzylheptene-1, o-vinyl-p-xylene, m-hexylstyrene, divinylbenzene, 1-allyl-4-vinylbenzene, allylamine, p-amylstyrene, allylcumene, allylxylene, allyltoluene, etc. Of the preceding the alpha olefins and olefins having 2 to about 12 carbons are preferred classes.

As previously mentioned a cocatalyst which can be employed with the Group VIII noble metal halide catalyst for the hydroformylation reaction is a poly(heterocyclic) amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine can be used also in catalytic amounts, e.g., from about 0.001 to about 10 weight percent; preferably from about 0.05 to 5 weight percent of the liquid reaction medium. In general, amines having from 1 to about about 4 nitrogen atoms and from 1 to about 25 carbons; preferably from 2 to about 10 carbons; can be employed for this purpose and the following is a listing of representative amines useful in my invention:

1,2,4-triazabicyclo(1.1.1)pentane;
1,5,6-triazabicyclo(2.1.1)hexane;
5-oxa-1,6-diazabicyclo(2.1.1)hexane;
5-thia-1,6-diazabicyclo(2.1.1)hexane;
2-oxa-1,5,6-triazabicyclo(2.1.1)hexane;
1,2,5,6-tetrazabicyclo(2.1.1)hexane;
5-oxa-1,2,3,6-tetrazabicyclo(2.1.1)hexane;
1-azabicyclo(3.3.1)heptane;
1-azabicyclo(2.2.1)heptane;
1,4-methiano-1,1-pyridine;
2-ox-1-azabicyclo(2.2.1)heptane;
1,4-diazabicyclo(2.2.1)heptane;
7-oxa-1-azabicyclo(2.2.1)heptane;
7-thia-1-azabicyclo(2.2.1)heptane;
1,7-diazabicyclo(2.2.1)heptane;
1,3,5-triazabicyclo(2.2.1)heptane;
1-azabicyclo(3.2.1)octane;
1,5-diazatricyclo(4.2.1)decane;
1,7-diazatricyclo(3.3.1.2)undecane;
7-ox-1-azabicyclo(3.2.1)octane;
1,7-diazabicyclo(3.2.1)octane;
3-thia-1,7-diazabicyclo(3.2.1)octane;
1,3,6,8-tetrazatricyclo(6.2.1)dodecane;
2,8-diazatricyclo(7.3.1.1)tetradecane;
1-azabicyclo(3.3.1)nonene, also known as 1-isogranatinine and the oxo, hydroxy and lower alkyl derivatives thereof;
1-azabicyclo(2.2.2)octane also known as quinuclidine as well as the halo, oxo, hydroxy and lower alkyl derivatives thereof;
1-azatricyclo(3.3.1.1)decane;
1,3-diazabicyclo(2.2.2)octane;
1,3-diazabicyclo(3.3.1)nonene;
1,6-diazatricyclo(5.3.1)dodecane;
2-ox-1-azabicyclo(2.2.2)octane;
4,6,10-triox-1-azatricyclo(3.3.1)decane;
1,5-diazabicyclo(3.3.1)nonene;
1,2,5,8-tetrazatricyclo(5.3.1.1)dodecane;
1,4-diazabicyclo(2.2.2)octane also known as triethylene diamine and its oxo, hydroxy, halo, and lower alkyl derivatives thereof;
1,3-diazatricyclo(3.3.1.1)decane also known as 1,3-diazadamantane;
1,3,5-triazatricyclo(3.3.1)decane;
1,3,5,7-tetrazabicyclo(3.3.1)nonene also known as pentamethylene tetramine;
1,3,5,7-tetrazatricyclo(3.3.1.1)decane also known as hexamethylene-tetramine;
2-oxa-1,3,4-triazabicyclo(3.3.1)nonene;
1-azabicyclo(4.3.1)decane;
1-azabicyclo(3.2.2)nonene;
1,5-diazabicyclo(3.2.2)nonene;
1,3,5,7-tetrazabicyclo(3.3.2)decane;
1,5-diazabicyclo(3.3.3)undecane, etc.

Of the aforementioned poly(heterocyclic)amines having a nitrogen in a bridgehead position the most common and widely known compound is 1,4-diazabicylo(2.2.2) octane (triethylenediamine) and this material as well as its oxo, hydroxy, halo and lower alkyl derivatives comprises the preferred cocatalyst from the aforementioned.

The invention will now be illustrated by the following specific modes of practice thereof:

EXAMPLE 1

A residue typical of that obtained from the hydroformylation of propylene using a rhodium hydride carbonyl tris-triphenylphosphine complex containing 1.2 grams RhHCO($C_6H_5$)$_3$P, 5 grams triphenylphosphine, ($C_6H_5$)$_3$P, and 100 grams of aldol polymers in 1000 milliliters toluene is treated to separate the metal containing complex catalyst from the residue by the procedure described in the following paragraphs.

A flask fitted with a reflux condenser, stirrer and thermometer is charged with 50 milliliters of the aforedescribed residue, 50 milliliters 1 N nitric acid and 1 milliliter 30 percent aqueous hydrogen peroxide. The flask contents are heated to reflux temperature and maintained at that temperature for 1 hour with stirring, then cooled and transferred to a separatory flask where the phases are permitted to separate and the aqueous phase is removed. The toluene and the aqueous phases are sampled and the samples are analyzed by flame photometry to determine that the single step extraction removes 98 percent of the rhodium present in the residue subjected to the treatment.

When the extraction is repeated with the substitution of 0.5 gram sodium peroxide for the hydrogen peroxide, the same results are obtained.

The extraction is repeated with the same procedure, however, the peroxide solution employed comprises 1 milliliter 30 percent aqueous hydrogen peroxide and 50 milliliters 10 weight percent sulfuric acid. The extraction in a single step effects 82 percent recovery of the rhodium catalyst from the residue subjected to the extraction.

When the reaction is performed with substitution of 5 milliliters of 10 weight percent persulfuric acid for the hydrogen peroxide, the same results are obtained.

The extraction is again repeated using as the extract 1 milliliter aqueous hydrogen peroxide and 50 milliliters 0.1 N nitric acid. This extraction effects a recovery of 46 percent of the rhodium contained in the residue subjected to the extraction.

Upon completion of the extraction, the aqueous phase is placed in the flask with the reflux condenser and heated to and maintained at 100° C. for 1 hour with stirring to insure complete decomposition of any peroxides remaining in the aqueous phase. The flask contents are then transferred to an autoclave and admixed with 200 milliliters toluene containing 5 weight percent triphenylphosphine. The autoclave is closed and pressured to 500 p.s.i.g. with carbon monoxide and heated to and maintained at 100° C. with stirring for 1 hour. Upon completion of the reaction period the autoclave contents are sampled and the samples analyzed to determine that 99 percent of the rhodium catalyst contained in the aqueous phase is extracted into the toluene phase containing the triphenylphosphine complex. Analysis of the aqueous phase reveals that none of the aldol polymers and heavy ends contained in the residue are extracted.

EXAMPLE 2

The effectiveness of various peroxides are investigated in a series of experiments described as follows:

To the extraction flask is charged 50 milliliters of a solution comprising 1.2 grams rhodium hydride carbonyl tris-triphenylphosphine in 1000 milliliters toluene and 25 milliliters formic acid, 25 milliliters 1 N hydrochloric acid and 5 milliliters 30 percent aqueous hydrogen peroxide are added to form performic acid in the extraction flask. The flask contents are heated to 50° C. and maintained at that temperature with stirring for 1 hour, then heated to reflux conditions and maintained at that temperature for 30 minutes with stirring. Upon completion of the extraction, the phases are transferred to a separatory flask, permitted to settle, and the aqueous phase is withdrawn and samples of each phase are analyzed to determine the percent of the rhodium complex catalyst removed from the toluene phase. This analysis reveals that 97 percent of the rhodium is extracted into the aqueous phase by this treatment.

When the experiment is repeated with substitution of 20 milliliters of 20 weight percent peracetic acid for the formic acid and hydrogen peroxide, substantially the same extraction results.

The aqueous extract is then returned to the extraction flask and admixed with a solution of 5 grams triphenylphosphine in 50 milliliters toluene and carbon monoxide is introduced into the extraction flask while the contents are heated to and maintained at reflux temperature. This treatment is continued for 60 minutes and thereafter the phases are permitted to separate. Analysis of the toluene phase reveals that 85 percent of the rhodium complex catalyst present in the aqueous phase is extracted into the toluene by the single step treatment.

The extraction is repeated by charging the flask with 50 milliliters of a solution of 1.2 grams rhodium hydride carbonyl tris-triphenylphosphine, 5 grams triphenylphosphine and 100 grams aldol polymer and 100 milliliters toluene. To the flask is then added 50 milliliters 1 N hydrochloric acid and 10 grams benzoyl peroxide. The flask contents are heated to 50° C. and maintained at that temperature for 1 hour with stirring, then heated to reflux temperature and maintained at that temperature for 30 minutes with stirring. Upon completion of this period, the contents are transferred to a separatory funnel, permitted to settle and are separated and sampled. Analyses of the samples reveals that 95 percent of the rhodium complex catalyst is extracted by this treatment.

When the extraction is repeated with substitution of 6 grams cumenyl hydroperoxide for the benzoyl peroxide previously used, substantially the same extraction results.

The extraction step is repeated using a sample of the same typical hydroformylation residue; however, the extract phase comprises 50 milliliters 1 N hydrochloric acid containing 10 grams of potassium persulfate. Upon completion of the extraction procedure, analyses of the extract and raffinate phases reveals that 85 percent of the rhodium complex catalyst is extracted by this treatment. When the aqueous extract phase is treated with the toluene and triphenylphosphine in the absence of the peroxide, following the procedure previously discussed, 60 percent of the rhodium complex containing catalyst is recovered in the toluene triphenylphosphine solution in a single step treatment.

EXAMPLE 3

A multistep extraction and peroxide treatment is performed on 100 milliliters of a residue obtained from the hydroformylation of propylene using a rhodium hydride carbonyl tris-triphenylphosphine complex. The residue is distilled at atmospheric pressure to remove the butyaldehyde product and solvent and then distilled under subatmospheric pressure at 1 milliliter mercury and 100° C. to remove the toluene solvent and a substantial portion, 60 to 80 percent, of the heavy residue.

The extraction flask is charged with 100 milliliters of the resulting heavy residue from the vacuum distillation, 100 milliliters 1 N nitric acid and 2 milliliters 30 weight percent aqueous hydrogen peroxide. The flask contents are heated to and maintained at reflux temperature with stirring for 1 hour, and then cooled and transferred to a separatory flask where the phases are permitted to settle. The phases are separated and the toluene phase is returned to the extraction flask together with 100 milliliters 1 N nitric acid and 2 milliliters 30 weight percent aqueous hydrogen peroxide in a repeat of the extraction step. The phases are separated and the procedure again repeated to perform a third extraction step on the toluene phase. The following table summarizes the content of the precious metal in the raffinate and extract phases in milligrams:

| Extraction step | Feed | Raffinate | Extract |
|---|---|---|---|
| First | 18.8 | 0.19 | 17.2 |
| Second | 0.19 | 0 | 0.12 |
| Third | 0 | 0 | 0 |

The data set forth in the preceding table evidence that substantially complete recovery, i.e., greater than 99 percent of the precious metal catalyst complex can be effected in a multistep treatment with the aqueous peroxide solution.

The preceding examples are intended solely to illustrate a mode of practice of the invention and to demonstrate results obtainable therewith. It is not intended that the invention be unduly limited by these specific examples but that the invention be defined by the steps and reagents and their obvious equivalents set forth in the following claims:

I claim:
1. The separation of Group VIII noble metal values from a high-boiling, hydroformylation residue stream containing a soluble complex of a Group VIII noble metal having a biphyllic ligand having the following formula:

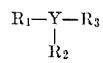

wherein:

Y is As, Sb, P, Bi or $P(O)_3$;
$R_1$ and $R_2$ each represent an alkyl or aminoalkyl having from 1 to 8 carbons, a cycloalkyl or aminocycloalkyl having from 5 to about 9 carbons or an aryl or aminoaryl having from 6 to 9 carbons;
$R_3$ is an alkyl having from 1 to 6 carbons, an aryl having from 6 to 8 carbons or a univalent radical having the following formula:

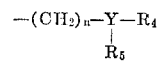

wherein:

$n$ is a whole number from 1 to 6; and
$R_4$ and $R_5$ each represent an alkyl having from 1 to 8 carbons or an aryl having from 6 to 8 carbons;

which comprises contacting, at a temperature from about 25° to about 200° C. and a pressure from 1 to about 1000 atmospheres, said residue stream with a peroxide in an amount of between 0.25 and about 5 times the molar quantity of said biphyllic ligand and sufficient to effect precipitation of said Group VIII noble metal complex from said residue stream and separating said precipitate from said stream; said peroxide selected from the class consisting of hydrogen, alkali and alkaline earth metal peroxides, persulfuric acid and alkali metal salts thereof, $C_1$–$C_8$ alkanoic and aromatic percarboxylic acids, $C_1$–$C_8$ alkyl, cycloalkyl and aralkyl hydroperoxides and dialkyl, diaryl and diaroyl peroxides having alkyl, aryl and aroyl groups with from 1 to about 8 carbons.

2. The method of claim 1 wherein said complex is a complex of rhodium.
3. The method of claim 1 wherein Y is phosphorus.
4. The method of claim 1 wherein said peroxide is hydrogen peroxide.
5. The method of claim 4 wherein said complex is a rhodium triphenylphosphine complex.
6. The method of claim 1 wherein an aqueous solution of said peroxide is contacted with said residue stream.
7. The method of claim 1 wherein said residue stream is from 1 to about 25 percent of the reaction medium employed in a hydroformylation reaction using said Group VIII noble metal complex as a homogeneous catalyst.
8. The liquid extraction of a rhodium complex from a high-boiling, hydroformylation residue stream containing a soluble complex of rhodium having a biphyllic ligand having the following formula:

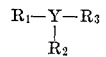

wherein:

Y is As, Sb, Bi; $P(O)_3$
$R_1$ and $R_2$ each represent an alkyl or aminoalkyl having from 1 to 8 carbons, a cycloalkyl or aminocycloalkyl having from 5 to 9 carbons, or an aryl aminoaryl having from 6 to 9 carbons; and
$R_3$ is an alkyl having from 1 to 6 carbons, an aryl having from 6 to 8 carbons or a univalent radical having the following formula:

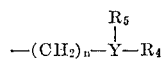

wherein:

n is a whole number from 1 to 6; and $R_4$ and $R_5$ each represent an alkyl having from 1 to 8 carbons or an aryl having from 6 to 8 carbons;

which comprises contacting said residue stream in an extraction zone at a temperature of between about 25° and 200° C. and at a pressure of between about 1 and 1000 atmospheres with an aqueous solution having a pH less than 7.0 and containing a peroxide in an amount between 0.25 and about 5 times the molar quantity of said biphyllic ligand to effect a transfer of said rhodium complex from said residue stream into said aqueous solution and recovering said aqueous solution from said extraction zone; said peroxide selected from the group consisting of hydrogen, alkali and alkaline earth metal peroxides, persulfuric acid and alkali metal salts thereof, $C_1$–$C_8$ alkanoic and aromatic percarboxylic acids, $C_1$–$C_8$ alkyl, cycloalkyl and aralkyl hydroperoxides and dialkyl, diaryl and diaroyl peroxides having alkyl, aryl and aroyl groups with from 1 to about 8 carbons.

9. The method of claim 8 wherein said aqueous solution recovered from said extraction zone is contacted with a non-polar-solvent solution containing said biphyllic ligand and carbon monoxide to extract said rhodium metal complex from said aqueous solution and into said non-polar-solvent solution.

10. The method of claim 8 wherein said aqueous solution also contains from about 0.1 to about 3 normal nitric, hydrohalic or sulfuric acid.

11. The method of claim 8 wherein said peroxide is hydrogen peroxide.

12. The method of claim 8 wherein said biphyllic ligand is triphenylphosphine.

References Cited

Copley et al., Proceedings Chem. Soc., 1964, pp. 300–301.

Vaska, Science, vol. 140 (1963), pp. 809–810.

Jensen et al., Acta Chemica Scandinavica, 17 (1963), p. 1124.

Booth et al., J. Chem. Soc. (1962), pp. 2099–2106.

TOBIAS E. LEVOW, Primary Examiner

A. P. DEMERS, Assistant Examiner

U.S. Cl. X.R.

252—429, 431; 260—239, 241, 243, 244, 248, 250, 269, 290, 298, 302, 307, 308, 309, 313.1, 439, 604